United States Patent
Patten et al.

(10) Patent No.: US 12,516,970 B2
(45) Date of Patent: Jan. 6, 2026

(54) USING A REYNOLDS NUMBER TO CORRECT A MASS FLOW RATE MEASUREMENT

(71) Applicant: MICRO MOTION, INC., Boulder, CO (US)

(72) Inventors: Andrew Timothy Patten, Gunnison, CO (US); Aart R. Pruysen, Ede (NL); Salvatore Pitti, Veenendaal (NL); Mark James Bell, Longmont, CO (US); Joel Weinstein, Boulder, CO (US); Anthony William Pankratz, Arvada, CO (US)

(73) Assignee: MICRO MOTION, INC., Boulder, CO (US)

( * ) Notice: Subject to any disclaimer, the term of this patent is extended or adjusted under 35 U.S.C. 154(b) by 284 days.

(21) Appl. No.: 18/031,247

(22) PCT Filed: Sep. 9, 2021

(86) PCT No.: PCT/US2021/049569
§ 371 (c)(1),
(2) Date: Apr. 11, 2023

(87) PCT Pub. No.: WO2022/093407
PCT Pub. Date: May 5, 2022

(65) Prior Publication Data
US 2024/0019286 A1    Jan. 18, 2024

Related U.S. Application Data

(60) Provisional application No. 63/107,593, filed on Oct. 30, 2020.

(51) Int. Cl.
*G01F 1/84* (2006.01)
*G01F 15/02* (2006.01)

(52) U.S. Cl.
CPC .......... *G01F 1/8436* (2013.01); *G01F 15/024* (2013.01)

(58) Field of Classification Search
CPC ............................ G01F 1/8436; G01F 15/024
(Continued)

(56) References Cited

U.S. PATENT DOCUMENTS 5,987,997 A   11/1999 Roskam et al.
6,170,338 B1   1/2001 Kleven et al.
(Continued)

FOREIGN PATENT DOCUMENTS

CN   110073177 A   7/2019
JP   H338605 B2   6/1991
(Continued)

OTHER PUBLICATIONS

Mills Chris: "Calibrating and operating Coriolis flow meters with respect to process effects", Flow Measurement and Instrumentation, Butterworth-Heinemann, Oxford, GB, vol. 71, Oct. 14, 2019 (Oct. 14, 2019), XP086069945, ISSN: 0955-5986, DOI: 10.1016/J. FLOWMEASINST.2019.101649 [retrieved on Oct. 14, 2019].

*Primary Examiner* — Peter J Macchiarolo
*Assistant Examiner* — Rodney T Frank
(74) *Attorney, Agent, or Firm* — The Ollila Law Group LLC

(57) ABSTRACT

A meter electronics (20) for using a Reynolds number to correct a mass flow rate measurement of a fluid is provided. The meter electronics (20) comprises an interface (401) configured to communicatively couple to a sensor assembly (10) containing the fluid and receive sensor signals from the sensor assembly (10) and a processing system (402) communicatively coupled to the interface (401). The processing system (402) is configured to store a Reynolds number-correction relationship, wherein the Reynolds number-cor- (Continued)

rection relationship relates Reynolds number values with Reynolds number-based correction values, calculate a Reynolds number of the fluid using a measured mass flow rate value of the fluid, and determine a Reynolds number-based correction value using the Reynolds number and the Reynolds number-correction relationship.

16 Claims, 6 Drawing Sheets

(58) Field of Classification Search
USPC .................................................. 73/861.354
See application file for complete search history.

(56) References Cited

U.S. PATENT DOCUMENTS

| | | |
|---|---|---|
| 6,343,507 B1 | 2/2002 | Felling et al. |
| 6,505,519 B2 | 1/2003 | Henry |
| 6,609,067 B2 | 8/2003 | Tare et al. |
| 6,651,513 B2 | 11/2003 | Wenger et al. |
| 6,763,730 B1 | 7/2004 | Wray |
| 7,040,181 B2 | 5/2006 | Rieder et al. |
| 7,072,775 B2 | 7/2006 | Hemp et al. |
| 7,284,449 B2 | 10/2007 | Rieder et al. |
| 10,436,692 B2 | 10/2019 | Huber et al. |
| 2008/0034890 A1 | 2/2008 | Barua et al. |
| 2010/0109653 A1 | 5/2010 | Nieuwenhuis et al. |
| 2019/0003875 A1* | 1/2019 | Natter .................. G01F 1/8436 |

FOREIGN PATENT DOCUMENTS

| | | |
|---|---|---|
| WO | 0036379 A1 | 6/2000 |
| WO | 2009107372 A1 | 9/2009 |
| WO | 2017062273 A1 | 4/2017 |
| WO | 2018208301 A1 | 11/2018 |

* cited by examiner

USING A REYNOLDS NUMBER TO CORRECT A MASS FLOW RATE MEASUREMENT

TECHNICAL FIELD

The embodiments described below relate to mass flow rate measurements and, more particularly, to using a Reynolds number to correct a mass flow rate measurement.

BACKGROUND

Vibratory meters, such as for example, Coriolis mass flowmeters, liquid density meters, gas density meters, liquid viscosity meters, gas/liquid specific gravity meters, gas/liquid relative density meters, and gas molecular weight meters, are generally known and are used for measuring characteristics of a fluid. Generally, vibratory meters comprise a sensor assembly and a meter electronics. The fluid measured by the sensor assembly may be flowing or stationary. The vibratory meter may be used to measure a mass flow rate, density, and/or other properties of a material measured by the sensor assembly. However, viscosity related effects can cause inaccuracies in the measurements, such as a mass flow rate measurement. A Reynolds number may be proportional to a viscosity of the material. Accordingly, there is a need for using a Reynolds number to correct a mass flow rate measurement.

SUMMARY

A meter electronics for using a Reynolds number to correct a mass flow rate measurement of a fluid is provided. According to an embodiment, the meter electronics comprises an interface configured to communicatively couple to a sensor assembly containing the fluid and receive sensor signals from the sensor assembly and a processing system communicatively coupled to the interface. The processing system is configured to store a Reynolds number-correction relationship, wherein the Reynolds number-correction relationship relates Reynolds number values with Reynolds number-based correction values, calculate a Reynolds number of the fluid using a measured mass flow rate value of the fluid, and determine a Reynolds number-based correction value using the Reynolds number and the Reynolds number-correction relationship.

A method of using a Reynolds number to correct a mass flow rate measurement of a fluid is provided. According to an embodiment, the method comprises receiving sensor signals with a meter electronics, wherein the sensor signals are provided by a sensor assembly containing the fluid, storing a Reynolds number-correction relationship in the meter electronics, wherein the Reynolds number-correction relationship relates Reynolds number values with Reynolds number-based correction values, calculating a Reynolds number of the fluid using a measured mass flow rate value of the fluid, and determining a Reynolds number-based correction value using the Reynolds number and the Reynolds number-correction relationship.

A system for using a Reynolds number to correct a mass flow rate measurement of a fluid is provided. According to an embodiment, the system comprises a sensor assembly containing the fluid and receive sensor signals from the sensor assembly and a meter electronics communicatively coupled to the sensor assembly. The meter electronics is configured to store a Reynolds number-correction relationship, wherein the Reynolds number-correction relationship relates Reynolds number values with Reynolds number-based correction values, calculate a Reynolds number of the fluid using a measured mass flow rate value of the fluid, and determine a Reynolds number-based correction value using the Reynolds number and the Reynolds number-correction relationship.

Aspects

According to an aspect, a meter electronics (20) for using a Reynolds number to correct a mass flow rate measurement of a fluid comprises an interface (401) configured to communicatively couple to a sensor assembly (10) containing the fluid and receive sensor signals from the sensor assembly (10) and a processing system (402) communicatively coupled to the interface (401). The processing system (402) is configured to store a Reynolds number-correction relationship, wherein the Reynolds number-correction relationship relates Reynolds number values with Reynolds number-based correction values, calculate a Reynolds number of the fluid using a measured mass flow rate value of the fluid, and determine a Reynolds number-based correction value using the Reynolds number and the Reynolds number-correction relationship.

Preferably, the processing system (402) being configured to calculate the Reynolds number correction factor using a measured mass flow rate value of the fluid comprises the processing system (402) being configured to calculate the Reynolds number using a viscosity value of the fluid and the measured mass flow rate value of the fluid.

Preferably, the processing system (402) being configured to calculate the Reynolds number correction factor using a measured mass flow rate value of the fluid comprises the processing system (402) being configured to calculate the Reynolds number using a dimension of a conduit in the sensor assembly (10) and the measured mass flow rate value of the fluid.

Preferably, the processing system (402) being configured to calculate the Reynolds number using the measured mass flow rate value of the fluid comprises the processing system (402) being configured to use the equation:

$$Re = \frac{2\dot{m}}{\pi d \mu};$$

where:
  $\dot{m}$ is the measured mass flow rate value of the fluid;
  d is a diameter of the conduit of the sensor assembly (10); and
  $\mu$ is a viscosity of the fluid.

Preferably, the interface (401) is further configured to communicatively couple with a transducer configured to measure and provide viscosity related information of the fluid and the meter electronics (20) is further configured to determine the viscosity value of the fluid based on the viscosity related information.

Preferably, the processing system (402) is further configured to determine a density value of the fluid from the sensor signals and determine the viscosity value from the density value.

Preferably, the Reynolds number-correction relationship comprises one of a mathematical relationship and ordered pairs that relate Reynolds number values with Reynolds number-based correction values.

According to an aspect, a method of using a Reynolds number to correct a mass flow rate measurement of a fluid comprises receiving sensor signals with a meter electronics, wherein the sensor signals are provided by a sensor assembly containing the fluid, storing a Reynolds number-correction relationship in the meter electronics, wherein the Reynolds number-correction relationship relates Reynolds number values with Reynolds number-based correction values, calculating a Reynolds number of the fluid using a measured mass flow rate value of the fluid, and determining a Reynolds number-based correction value using the Reynolds number and the Reynolds number-correction relationship.

Preferably, calculating the Reynolds number of the fluid using the measured mass flow rate of the fluid comprises calculating the Reynolds number of the fluid using a viscosity value of the fluid and the measured mass flow rate value of the fluid.

Preferably, calculating the Reynolds number of the fluid using the measured mass flow rate of the fluid comprises calculating the Reynolds number of the fluid using a dimension of a conduit in the sensor assembly and the measured mass flow rate value of the fluid.

Preferably, calculating the Reynolds number using the measured mass flow rate value of the fluid comprises using the equation:

$$Re = \frac{2\dot{m}}{\pi d \mu};$$

where:
  $\dot{m}$ is the measured mass flow rate value of the fluid;
  d is a diameter of the conduit of the sensor assembly (10); and
  µ is a viscosity of the fluid.

Preferably, the method further comprises receiving viscosity related information from a transducer configured to measure and provide viscosity related information of the fluid and determining the viscosity value of the fluid using the viscosity related information.

Preferably, the method further comprises determining a density value of the fluid from the sensor signals and determining the viscosity value from the density value.

Preferably, the Reynolds number-correction relationship comprises one of a mathematical relationship and ordered pairs that relate Reynolds number values with Reynolds number-based correction values.

According to an aspect, a system (600) for using a Reynolds number to correct a mass flow rate measurement of a fluid comprises a sensor assembly (10) containing the fluid and receive sensor signals from the sensor assembly (10) and a meter electronics (20) communicatively coupled to the sensor assembly (10). The meter electronics (20) is configured to store a Reynolds number-correction relationship, wherein the Reynolds number-correction relationship relates Reynolds number values with Reynolds number-based correction values, calculate a Reynolds number of the fluid using a measured mass flow rate value of the fluid, and determine a Reynolds number-based correction value using the Reynolds number and the Reynolds number-correction relationship.

Preferably, the system (600) further comprises a transducer (610) communicatively coupled to the meter electronics (20), the transducer (610) being configured to provide viscosity related information to the meter electronics (20), and wherein the meter electronics (20) is configured to calculate the viscosity value of the fluid using the viscosity related information provided by the transducer (610).

BRIEF DESCRIPTION OF THE DRAWINGS

The same reference number represents the same element on all drawings. It should be understood that the drawings are not necessarily to scale.

DETAILED DESCRIPTION

FIGS. 1-6 and the following description depict specific examples to teach those skilled in the art how to make and use the best mode of embodiments of using a Reynolds number to correct a mass flow rate measurement of a fluid. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of using the Reynolds number to correct a mass flow rate measurement. As a result, the embodiments described below are not limited to the specific examples described below, but only by the claims and their equivalents.

Figure 1:
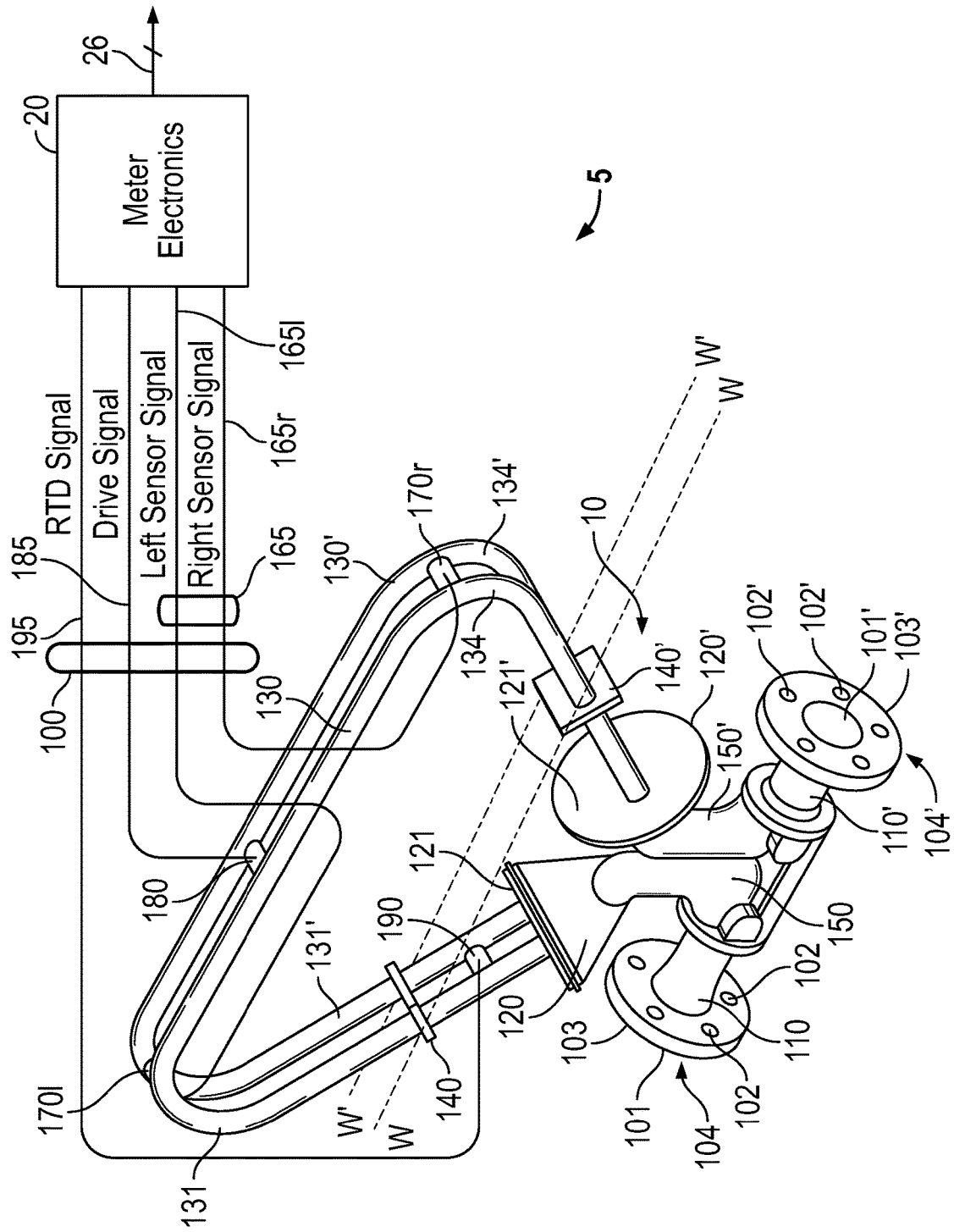
FIG. 1 shows a vibratory meter 5 for using a Reynolds number to correct a mass flow rate measurement.

FIG. 1 shows a vibratory meter 5 for using a Reynolds number to correct a mass flow rate measurement. As shown in FIG. 1, the vibratory meter 5 comprises a sensor assembly 10 and meter electronics 20. The sensor assembly 10 responds to mass flow rate and density of a process material. The meter electronics 20 is connected to the sensor assembly 10 via leads 100 to provide density, mass flow rate, and temperature information over port 26, as well as other information.

The sensor assembly 10 includes a pair of manifolds 150 and 150', flanges 103 and 103' having flange necks 110 and 110', a pair of parallel conduits 130 and 130', driver 180, resistive temperature detector (RTD) 190, and a pair of pick-off sensors 170l and 170r. Conduits 130 and 130' have two essentially straight inlet legs 131, 131' and outlet legs 134, 134', which converge towards each other at conduit mounting blocks 120 and 120'. The conduits 130, 130' bend at two symmetrical locations along their length and are essentially parallel throughout their length. Brace bars 140 and 140' serve to define the axis W and W' about which each conduit 130, 130' oscillates. The legs 131, 131' and 134, 134' of the conduits 130, 130' are fixedly attached to conduit mounting blocks 120 and 120' and these blocks, in turn, are fixedly attached to manifolds 150 and 150'. This provides a continuous closed material path through sensor assembly 10.

When flanges 103 and 103', having holes 102 and 102' are connected, via inlet end 104 and outlet end 104' into a process line (not shown) which carries the process material that is being measured, material enters inlet end 104 of the meter through an orifice 101 in the flange 103 and is conducted through the manifold 150 to the conduit mounting block 120 having a surface 121. Within the manifold 150 the material is divided and routed through the conduits 130, 130'. Upon exiting the conduits 130, 130', the process material is recombined in a single stream within the block 120' having a surface 121' and the manifold 150' and is thereafter routed to outlet end 104' connected by the flange 103' having holes 102' to the process line (not shown).

The conduits 130, 130' are selected and appropriately mounted to the conduit mounting blocks 120, 120' so as to have substantially the same mass distribution, moments of inertia and Young's modulus about bending axes W-W and W'-W', respectively. These bending axes go through the brace bars 140, 140'. Inasmuch as the Young's modulus of the conduits change with temperature, and this change affects the calculation of flow and density, RTD 190 is mounted to conduit 130' to continuously measure the temperature of the conduit 130'. The temperature of the conduit 130' and hence the voltage appearing across the RTD 190 for a given current passing therethrough is governed by the temperature of the material passing through the conduit 130'. The temperature dependent voltage appearing across the RTD 190 is used in a well-known method by the meter electronics 20 to compensate for the change in elastic modulus of the conduits 130, 130' due to any changes in conduit temperature. The RTD 190 is connected to the meter electronics 20 by lead 195.

Both of the conduits 130, 130' are driven by driver 180 in opposite directions about their respective bending axes W and W' and at what is termed the first out-of-phase bending mode of the flow meter. This driver 180 may comprise any one of many well-known arrangements, such as a magnet mounted to the conduit 130' and an opposing coil mounted to the conduit 130 and through which an alternating current is passed for vibrating both conduits 130, 130'. A suitable drive signal 185 is applied by the meter electronics 20, via a lead, to the driver 180.

The meter electronics 20 receives the RTD temperature signal on lead 195, and sensor signals 165 appearing on leads 100 carrying left and right sensor signals 165$l$, 165$r$, respectively. The meter electronics 20 produces the drive signal 185 appearing on the lead to driver 180 and vibrate conduits 130, 130'. The meter electronics 20 processes the left and right sensor signals 165$l$, 165$r$ and the RTD signal 195 to compute the mass flow rate and the density of the material passing through sensor assembly 10. This information, along with other information, is applied by meter electronics 20 over path 26 as a signal. A more detailed discussion of the meter electronics 20 follows.

Figure 2:
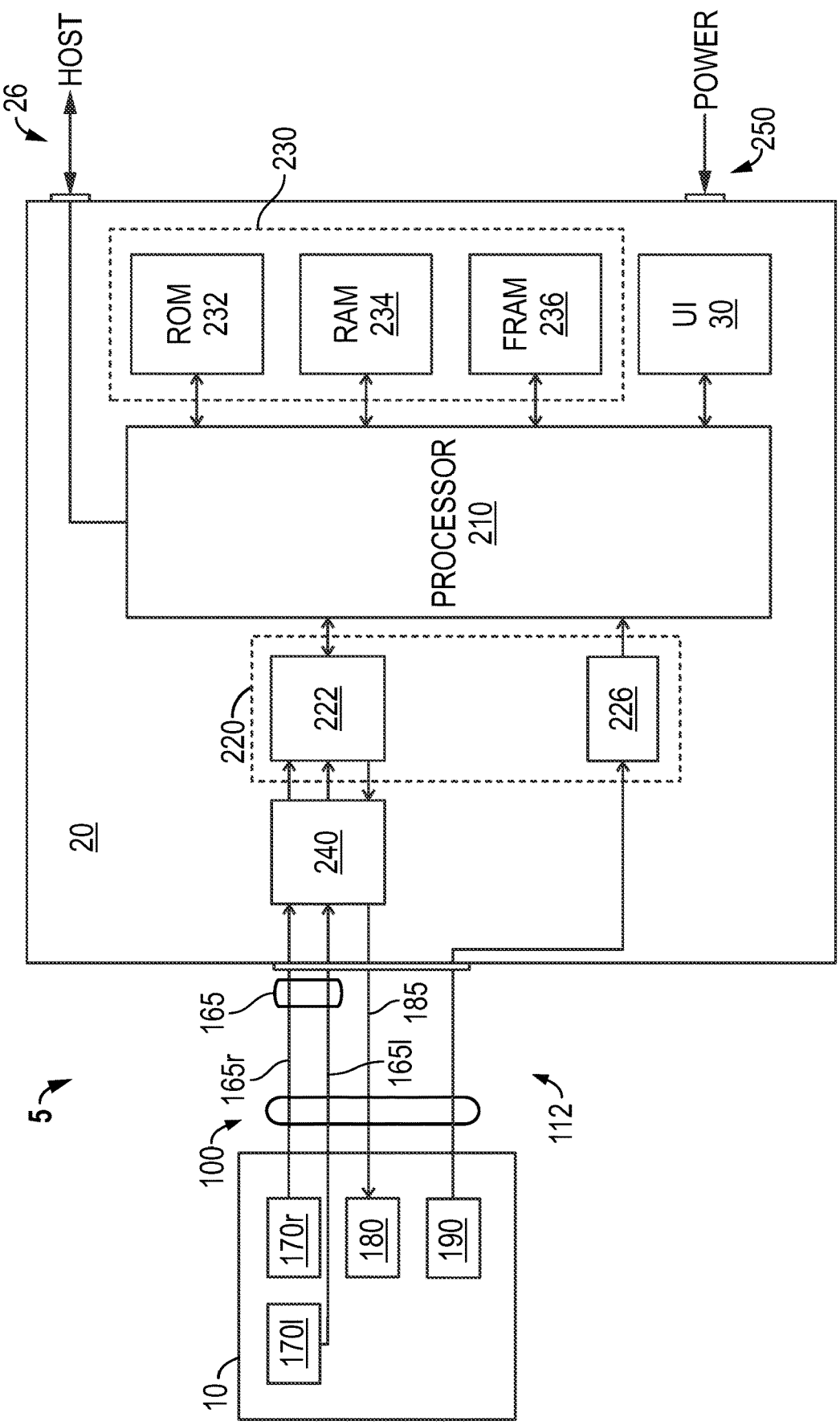
FIG. 2 shows a block diagram of the vibratory meter 5, including a block diagram representation of the meter electronics 20.

FIG. 2 shows a block diagram of the vibratory meter 5, including a block diagram representation of the meter electronics 20. As shown in FIG. 2, the meter electronics 20 is communicatively coupled to the sensor assembly 10. As described in the foregoing with reference to FIG. 1, the sensor assembly 10 includes the left and right pick-off sensors 170$l$, 170$r$, driver 180, and temperature sensor 190, which are communicatively coupled to the meter electronics 20 via the set of leads 100 through a communications channel 112.

The meter electronics 20 provides a drive signal 185 via the leads 100. More specifically, the meter electronics 20 provides a drive signal 185 to the driver 180 in the sensor assembly 10. In addition, sensor signals 165 comprising the left sensor signal 165$l$ and the right sensor signal 165$r$ are provided by the sensor assembly 10. More specifically, in the embodiment shown, the sensor signals 165 are provided by the left and right pick-off sensor 170$l$, 170$r$ in the sensor assembly 10. As can be appreciated, the sensor signals 165 are respectively provided to the meter electronics 20 through the communications channel 112.

The meter electronics 20 includes a processor 210 communicatively coupled to one or more signal processors 220 and one or more memories 230. The processor 210 is also communicatively coupled to a user interface 30. The processor 210 is communicatively coupled with the host via a communication port over the port 26 and receives electrical power via an electrical power port 250. The processor 210 may be a microprocessor although any suitable processor may be employed. For example, the processor 210 may be comprised of sub-processors, such as a multi-core processor, serial communication ports, peripheral interfaces (e.g., serial peripheral interface), on-chip memory, I/O ports, and/or the like. In these and other embodiments, the processor 210 is configured to perform operations on received and processed signals, such as digitized signals.

The processor 210 may receive digitized sensor signals from the one or more signal processors 220. The processor 210 may also receive signals from transducers, such as a viscometer, densimeter, and/or the like, via, for example, the port. That is, a transducer may be communicatively coupled to the processor 210 via the port 26. The transducers may be fluidly coupled to the sensor assembly 10. The transducer or transducers may be upstream and/or downstream from the sensor assembly 10. Accordingly, the processor 210 may be configured to determine fluid properties such as mass flow rate, density, viscosity, or the like, using the digitized sensor signals and/or signal provided by the transducers.

The processor 210 is also configured to provide information, such as a time delay, a property of a fluid in the sensor assembly 10, or the like. The processor 210 may provide the information to the host through the port 26. The processor 210 may also be configured to communicate with the one or more memories 230 to receive and/or store information in the one or more memories 230. For example, the processor 210 may receive calibration factors and/or sensor assembly zeros (e.g., time difference when there is zero flow) from the one or more memories 230. Each of the calibration factors and/or sensor assembly zeros may respectively be associated with the flow meter and/or the sensor assembly 10. The processor 210 may use the calibration factors to process digitized sensor signals received from the one or more signal processors 220.

The one or more signal processors 220 is shown as being comprised of an encoder/decoder (CODEC) 222 and an analog-to-digital converter (ADC) 226. The one or more signal processors 220 may condition analog signals, digitize the conditioned analog signals, and/or provide the digitized signals. The CODEC 222 is configured to receive the sensor signals 165 from the left and right pick-off sensors 170$l$, 170$r$. The CODEC 222 is also configured to provide the drive signal 185 to the driver 180. In alternative embodiments, more or fewer signal processors may be employed.

As shown, the sensor signals 165 are provided to the CODEC 222 via a signal conditioner 240. The drive signal 185 is provided to the driver 180 via the signal conditioner 240. Although the signal conditioner 240 is shown as a single block, the signal conditioner 240 may be comprised of signal conditioning components, such as two or more op-amps, filters, such as low pass filters, voltage-to-current amplifiers, or the like. For example, the sensor signals 165 may be amplified by a first amplifier and the drive signal 185 may be amplified by the voltage-to-current amplifier. The amplification can ensure that the magnitude of the sensor signals 165 is approximate the full-scale range of the CODEC 222.

In the embodiment shown, the one or more memories 230 is comprised of a read-only memory (ROM) 232, random access memory (RAM) 234, and a ferroelectric random-access memory (FRAM) 236. However, in alternative embodiments, the one or more memories 230 may be comprised of more or fewer memories. Additionally, or alternatively, the one or more memories 230 may be comprised of different types of memory (e.g., volatile, non-volatile, etc.). For example, a different type of non-volatile memory, such as, for example, erasable programmable read only memory (EPROM), or the like, may be employed instead of the FRAM 236. The one or more memories 230 may be a storage configured to store process data, such as drive or sensor signals, mass flow rate or density measurements, etc.

A mass flow rate measurement (n) can be generated according to the equation:

$$\dot{m} = FCF[\Delta t - \Delta t_0]. \quad [1]$$

The $\Delta t$ term comprises an operationally-derived (i.e., measured) time delay value comprising the time delay existing between the pickoff sensor signals, such as where the time delay is due to Coriolis effects related to mass flow rate through the vibratory flowmeter 5. The measured $\Delta t$ term ultimately determines the mass flow rate of the flow material as it flows through the vibratory flowmeter 5. The $\Delta t_0$ term comprises a time delay at zero flow calibration constant. The $\Delta t_0$ term is typically determined at the factory and programmed into the vibratory flowmeter 5. The time delay at zero flow $\Delta t_0$ term may not change, even where flow conditions are changing. A mass flow rate of flow material flowing through the flow meter is determined by multiplying a measured time delay by the flow calibration factor FCF. The flow calibration factor FCF is proportional to a physical stiffness of the flow meter.

As to density, a resonance frequency at which each conduit 130, 130' will vibrate may be a function of the square root of a spring constant of the conduit 130, 130' divided by the total mass of the conduit 130, 130' having a material. The total mass of the conduit 130, 130' having the material may be a mass of the conduit 130, 130' plus a mass of a material inside the conduit 130, 130'. The mass of the material in the conduit 130, 130' is directly proportional to the density of the material. Therefore, the density of this material may be proportional to the square of a period at which the conduit 130, 130' containing the material oscillates multiplied by the spring constant of the conduit 130, 130'. Hence, by determining the period at which the conduit 130, 130' oscillates and by appropriately scaling the result, an accurate measure of the density of the material contained by the conduit 130, 130' can be obtained. The meter electronics 20 can determine the period or resonance frequency using the sensor signals 165 and/or the drive signal 185.

The mass flow rate measured by the sensor assembly 10 may be inaccurate due to, for example, viscosity related effects. Accordingly, a mass flow rate value may be corrected by using a correction value to compensate for some inaccuracies. For example, a Reynolds number-based correction value may be used to correct a mass flow rate value calculated using above equation [1]. The Reynolds number-based correction value may be used to correct the mass flow rate value by using a relationship between a Reynolds value and the Reynolds number-based correction value. An exemplary relationship is described in the following with reference to FIG. 3.

Figure 3:
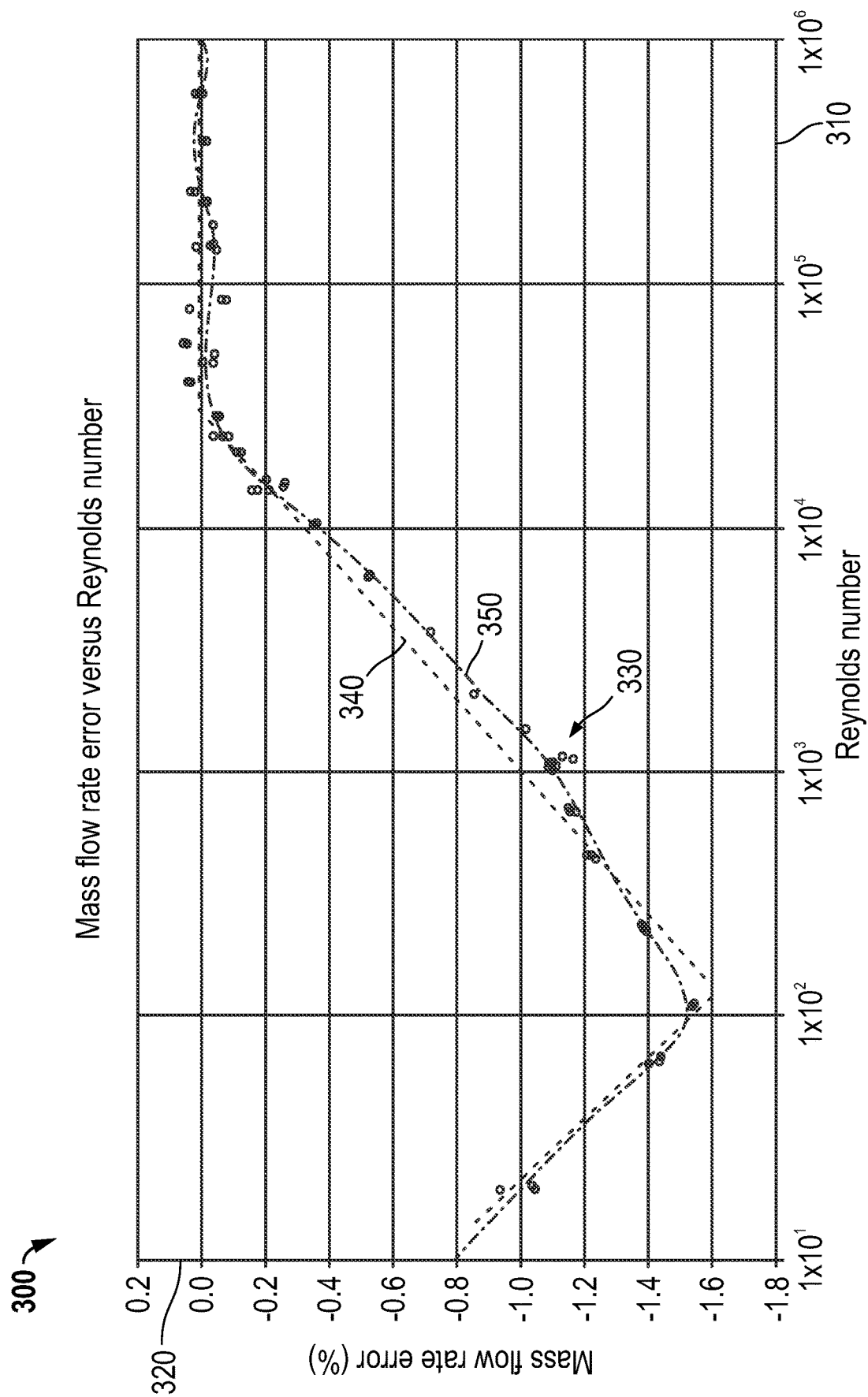
FIG. 3 shows a graph 300 illustrating a Reynolds number-correction relationship for using a Reynolds number to correct a mass flow rate measurement.

FIG. 3 shows a graph 300 illustrating a Reynolds number-correction relationship for using a Reynolds number to correct a mass flow rate measurement. As shown in FIG. 3, the graph 300 includes a Reynolds number axis 310 and a mass flow rate error axis 320. The Reynolds number axis 310 ranges from $1 \times 10^1$ to $1 \times 10^6$ and the mass flow rate error 320 ranges from $-1.8$ to $0.2$ percent. The graph 300 also includes data points 330, a segmented linear relationship 340, and a polynomial relationship 350 that relate Reynolds number values with mass flow rate error values.

As can be seen, the data points 330 are about $-1.0$ percent mass flow rate error at about Reynolds number of $1 \times 10^1$, drops to about $-1.6$ percent mass flow rate error at Reynolds number of about $1 \times 10^2$, and increases to about $0.0$ percent mass flow rate error at Reynolds number of about $5 \times 10^4$. For Reynolds numbers ranging from $5 \times 10^4$ to $1 \times 10^6$, the percent mass flow rate values remain at about $0.0$ percent mass flow rate error. As can be appreciated, the data points 330 may be viewed as having segmented portions comprised of linear function segments over the Reynolds number ranges of $1 \times 10^1$ to $1 \times 10^2$ and $1 \times 10^2$ to $5 \times 10^4$, and a constant of $0.0$ at Reynolds numbers above $5 \times 10^4$. Accordingly, the segmented linear relationship 340 may be determined by using, for example, linear regression. However, the data points 330 may be modeled with any suitable relationship, such as the polynomial relationship 350 by using polynomial regression, or the like.

Although the data points 330 relate Reynolds number values with percent mass flow rate error values, the percent mass flow rate error values may be used to determine correction values that can be used to correct a mass flow rate value. For example, the percent mass flow rate error value may be used to determine factors that can be multiplied with a mass flow rate value. Such a factor may be a Reynolds number-based correction value. Additionally, or alternatively, the data points 330 may be used to derive mathematical equations, such as the segmented linear relationship 340, the polynomial relationship 350, or the like, that relate a Reynolds number (e.g., as an independent variable) with a mass flow rate error and/or Reynolds number-based correction values.

The Reynolds number-based correction value may be used to correct a mass flow rate measurement. An exemplary correction of a mass flow rate measurement may be as follows. First, a Reynolds number may be calculated using, for example, below equation [7]. An exemplary Reynolds number value may be Re=1000. The Reynolds number value and a Reynolds number-correction relationship, such as the data points 330 described above, may be used to determine a percent mass flow rate error value of $-1.1\%$. A percent mass flow rate error value of $-1.1\%$ may be converted into a Reynolds number-based correction value of $1.011$ as follows:

$$\text{Re correction} = \frac{1}{1 + \frac{e}{100}} = \frac{1}{1 + \frac{-1.1}{100}} = 1.011; \quad [2]$$

where:
e is percent mass flow rate error; and
Re correction is a Reynolds number-based correction value.

The Reynolds number-based correction value may be multiplied with an uncorrected mass flow rate to determine a corrected mass flow rate as follows:

$$\text{Corrected Mass Flow} = (\text{Measured Mass Flow}) \cdot (\text{Re Correction}); \quad [3]$$

where:
Measured Mass Flow is an uncorrected mass flow rate that may be determined by using, for example, above equation [1].

As can be appreciated, the uncorrected mass flow rate may be corrected or compensated for other non-Reynolds parameters, such as temperature, pressure, or the like.

Still referring to FIG. 3, the data points 330 may be ordered pairs that are stored in a meter electronics, such as the meter electronics 20 described above, for determining a correction value. Additionally, or alternatively, the data points 330 may be used to derive correction values, relationships between Reynolds numbers and the correction values, and/or the like, that can be stored in the meter electronics. For example, the meter electronics may store ordered pairs of Reynolds number-based correction values and Reynolds numbers. Additionally, or alternatively, for example, the segmented linear relationship 340, polynomial relationship 350, and/or the like, may be stored. Accordingly, a Reynolds number-correction relationship may be determined and stored in the meter electronics. The meter electronics may therefore use the Reynolds number-correction relationship to determine a Reynolds number-based correction value.

Figure 4:
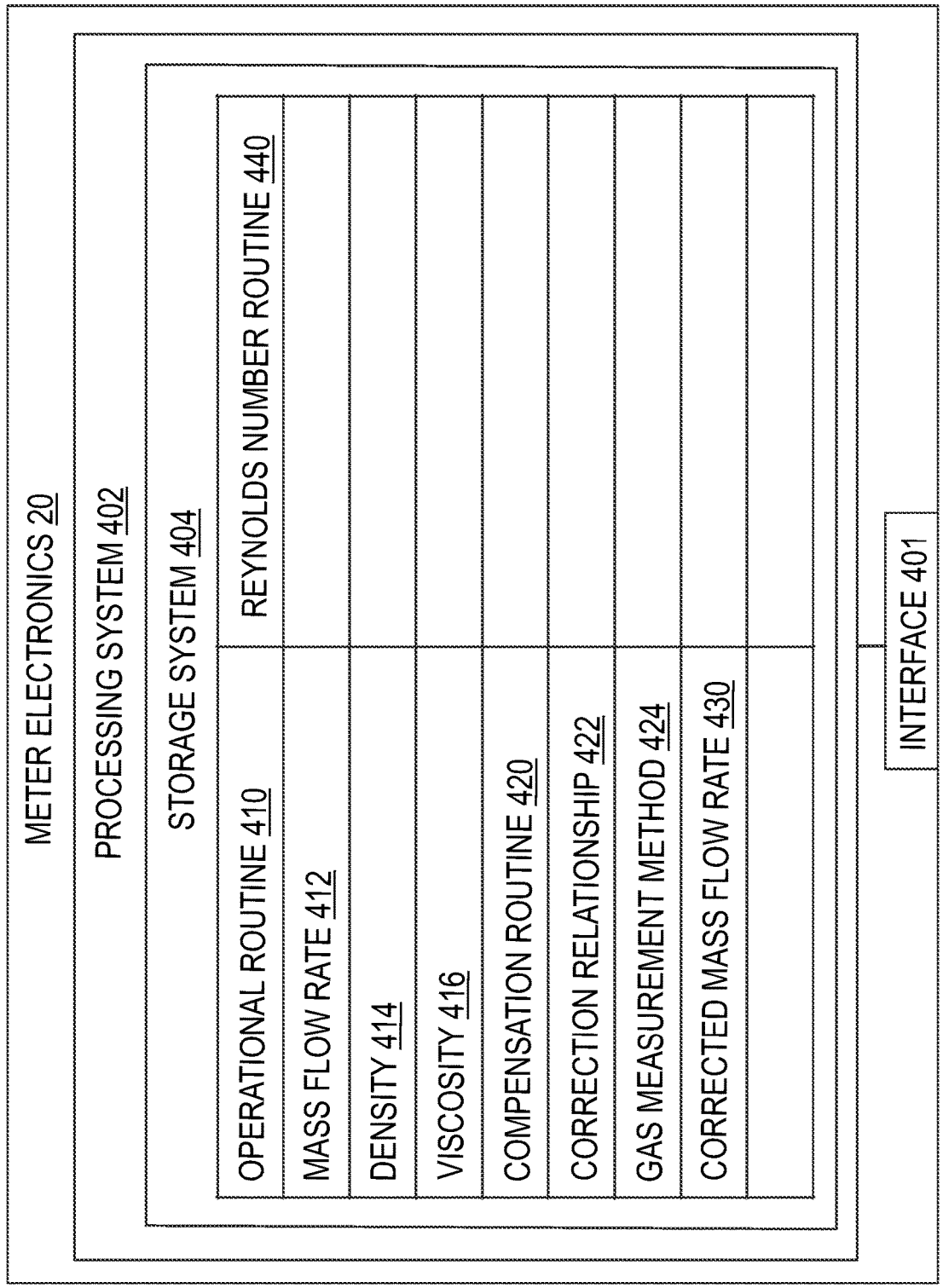
FIG. 4 shows a meter electronics 20 for using a Reynolds number to correct a mass flow rate measurement.

FIG. 4 shows a meter electronics 20 for using a Reynolds number to correct a mass flow rate measurement. As shown in FIG. 4, the meter electronics 20 includes an interface 401 and a processing system 402. The meter electronics 20 receives a vibrational response from a sensor assembly, such as the sensor assembly 10, for example. The meter electronics 20 processes the vibrational response in order to obtain flow characteristics of the flow material flowing through the sensor assembly 10.

The interface 401 may receive the sensor signals 165 from one of the pick-off sensors 170l, 170r shown in FIGS. 1 and 2. The interface 401 can perform any necessary or desired signal conditioning, such as any manner of formatting, amplification, buffering, etc. Alternatively, some or all of the signal conditioning can be performed in the processing system 402. In addition, the interface 401 can enable communications between the meter electronics 20 and external devices. The interface 401 can be capable of any manner of electronic, optical, or wireless communication. The interface 401 can provide information based on the vibrational response. The interface 401 may be coupled with a digitizer, such as the CODEC 222 shown in FIG. 2, wherein the sensor signal comprises an analog sensor signal. The digitizer samples and digitizes an analog sensor signal and produces a digitized sensor signal.

The processing system 402 conducts operations of the meter electronics 20 and processes flow measurements from the sensor assembly 10. The processing system 402 executes one or more processing routines and thereby processes the flow measurements in order to produce one or more flow characteristics. The processing system 402 is communicatively coupled to the interface 401 and is configured to receive the information from the interface 401.

The processing system 402 can comprise a general-purpose computer, a micro-processing system, a logic circuit, or some other general purpose or customized processing device. Additionally, or alternatively, the processing system 402 can be distributed among multiple processing devices. The processing system 402 can also include any manner of integral or independent electronic storage medium, such as the storage system 404.

The storage system 404 can store flow meter parameters and data, software routines, constant values, and variable values. In one embodiment, the storage system 404 includes routines that are executed by the processing system 402, such as an operational routine 410 and a compensation routine 420 of the vibratory meter 5. The storage system can also store statistical values, such as a standard deviation, confidence intervals, or the like.

The operational routine 410 may determine a mass flow rate 412 value and a density 414 value based on the sensor signals received by the interface 401. The mass flow rate 412 value may be a measured mass flow rate value. The mass flow rate 412 may be determined from the sensor signals, such as a time delay between a left pickoff sensor signal and a right pickoff sensor signal. The density 414 may also be determined from the sensor signals by, for example, determining a frequency from one or both of the left and right pickoff sensor signals.

The operational routine 410 may also determine a viscosity 416 value. For example, the meter electronics 20 may be communicatively coupled to a viscometer that measures a viscosity of the fluid. Additionally, or alternatively, a customer can input a fixed viscosity value, via a MODBUS register, for instance. As to a viscometer that may be communicatively coupled to the meter electronics 20, a dynamic viscosity measurement may be obtained from a separate on-line instrument, such as, for example, a fork viscosity meter. In another example, a viscosity may be calculated by employing a known viscosity-temperature relationship. In this example, the viscosity could be input by, for example, a customer and the temperature relationship can be programmed into the meter electronics 20. Viscosity can be calculated from the viscosity-temperature relationship.

The viscosity 416 value can also be determined by using the sensor signals. For example, a viscosity may be determined from a density 414 value. The viscosity determined from the measured density may have a greater uncertainty than a viscosity measured directedly by a viscometer or input by a customer. Additionally, or alternatively, the viscosity may be determined from a damping measured by the sensor assembly. For example, a power of a drive signal may be determined from drive gain or drive current. The power of the drive signal may be a function of damping. The damping may also be determined by determining an amplitude of a −3 dB point of a resonant curve. The viscosity can be for any suitable fluid, such as a power-law fluid, where a viscosity is determined at two different shear rates (e.g., velocities) of the power-law fluid. However, any suitable steps, including combinations of steps described above, can be employed to calculate the viscosity.

The compensation routine 420 may correct a mass flow rate value, such as a measured mass flow rate value. For example, the compensation routine 420 may correct the mass flow rate 412 with a correction value. The correction value may be determined from a correction relationship 422. The correction relationship 422 may be a Reynolds number-correction relationship that correlates Reynolds number values with Reynolds number-based correction values. For example, the Reynolds number-correction relationship may be comprised of ordered pairs of Reynolds number and Reynolds number-based correction values, where the Reynolds number-based correction values are factors that are multiplied with a mass flow rate 412 value to determine a corrected mass flow rate 430 value. For example, above equations [2] and [3] may be used. The corrected mass flow rate 430 may be output as a more accurate mass flow rate value because the viscosity effects are compensated for.

The meter electronics 20 is shown as also including a Reynolds number routine 440. The Reynolds number routine 440 may determine a Reynolds number of the fluid in the sensor assembly. For example, the meter electronics 20 may determine a Reynolds number using a viscosity 416 value and a mass flow rate 412 value. As discussed above, the mass flow rate 412 value may be a measured mass flow rate value, as is explained in more detail in the following.

Reynolds Number Based on a Mass Flow Rate

From fluid mechanics, the Reynolds number may be defined as:

$$Re = \frac{\rho dV}{\mu};\qquad [4]$$

where:
- $\rho$ is a density of a fluid contained by a sensor assembly;
- d is an internal diameter of a conduit in the sensor assembly;
- V is a fluid velocity of the fluid contained by the sensor assembly; and
- $\mu$ is a fluid viscosity of the fluid contained by the sensor assembly.

However, density values determined based on a frequency of the sensor assembly may have a greater uncertainty than a mass flow rate value, where the mass flow rate is determined from a twist or Coriolis mode of the sensor assembly. That is, a measured mass flow rate may have less uncertainty than a density value.

To address this issue, it is noted that the fluid velocity may be defined as:

$$V = \frac{\dot{m}}{\rho A};\qquad [5]$$

where:
- $\dot{m}$ is a mass flow rate of the fluid contained by the sensor assembly; and
- A is a cross-sectional area defined by the internal diameter of the conduit of the sensor assembly.

If the sensor assembly is comprised of two cylindrical conduits having a same diameter, the cross-sectional area of the two conduits may be defined as:

$$A = 2\frac{\pi}{4}d^2.\qquad [6]$$

Accordingly, substituting [4] and [3] into [2] results in:

$$Re = \frac{2\dot{m}}{\pi d \mu}.\qquad [7]$$

As can be seen, the Reynolds number of equation [7] is determined using an internal diameter of the conduit and the mass flow rate of the fluid. The mass flow rate of the fluid may be determined by using the sensor signals provided by the sensor assembly, where the sensor signals include a time delay between the left and right pickoff signal. The mass flow rate of equation [7] may therefore be a measured mass flow rate value.

The Reynolds number can be determined using other equations, such as a Reynolds number for a power-law fluid. For example, in the example of a power-law fluid, a viscosity may be measured at two different shear rates, or velocities, of a power-law fluid in a sensor assembly. The viscosity value may be used as an effective viscosity for the following relationship:

$$\mu_{eff} = K\left(\frac{\partial u}{\partial y}\right)^{n-1};\qquad [8]$$

where:
- $\mu_{eff}$ is an effective viscosity;
- K is a flow consistency index;
- $\partial u/\partial y$ is a shear rate or the velocity gradient perpendicular to the plane of shear; and
- n is the flow behavior index.

The value of the flow consistency index K and flow behavior index n can be obtained from a graph of $\log(\mu_{eff})$ and $$\log\left(\frac{\partial u}{\partial y}\right).$$

The slope line gives the value of n−1 from which n can be calculated. The intercept at $$\log\left(\frac{\partial u}{\partial y}\right) = 0$$

gives the value of K. Accordingly, values of the flow consistency index K and flow behavior index n may be determined with the viscosity measurement.

The flow consistency index K and flow behavior index n can be used to determine a Reynolds number value using any suitable method, such as a table or equation that relate a Reynolds number to a mass flow rate. For example, a table or equation that relate Reynolds number values with mass flow rate, flow consistency index K, and flow behavior index n values may be stored in the meter electronics and subsequently used to determine the Reynolds number value from a mass flow rate and viscosity measurement.

The meter electronics may comprise an interface, such as the interface 401 described above, configured to communicatively couple to a sensor assembly, such as the sensor assembly 10 described above, that contains the fluid and receives sensor signals from the sensor assembly 10. The meter electronics may also comprise a processing system, such as the processing system 402 described above, communicatively coupled to the interface. The interface may also be configured to communicatively couple with a transducer configured to measure and provide viscosity related information of the fluid.

The mass flow rate value may be calculated based on a time-delay between a left pickoff sensor signal and a right pickoff sensor signal of the sensor signals. The time-delay between the left pickoff sensor signal and the right pickoff sensor signal of the sensor signals may be calculated using zero crossing points of the left pickoff sensor signal and the right pickoff sensor signal. The processing system may also correct a mass flow rate measurement, as described above with reference to equations [2] and [3], although any suitable correction equations, methods or the like may be employed.

The processing system may be configured to store a Reynolds number-correction relationship, where the Reynolds number-correction relationship relates Reynolds number values with Reynolds number-based correction values. The processing system may also calculate a Reynolds number of the fluid using a viscosity value of the fluid, a dimension of a conduit in the sensor assembly, and/or a measured mass flow rate value of the fluid and determine a Reynolds number-based correction value using the Reynolds number and the Reynolds number-correction relationship. The processing system may calculate the Reynolds number using above equation [7]. The processing system may be configured to determine a density value of the fluid from the sensor signals and determine the viscosity value from the density value. The Reynolds number-correction relationship comprises one of a mathematical relationship and ordered pairs that relate Reynolds number values with Reynolds number-based correction values. Accordingly, the processing system may determine a Reynolds number-based correction value using the Reynolds number and the Reynolds number-correction relationship by executing a method, such as the method described below.

Figure 5:
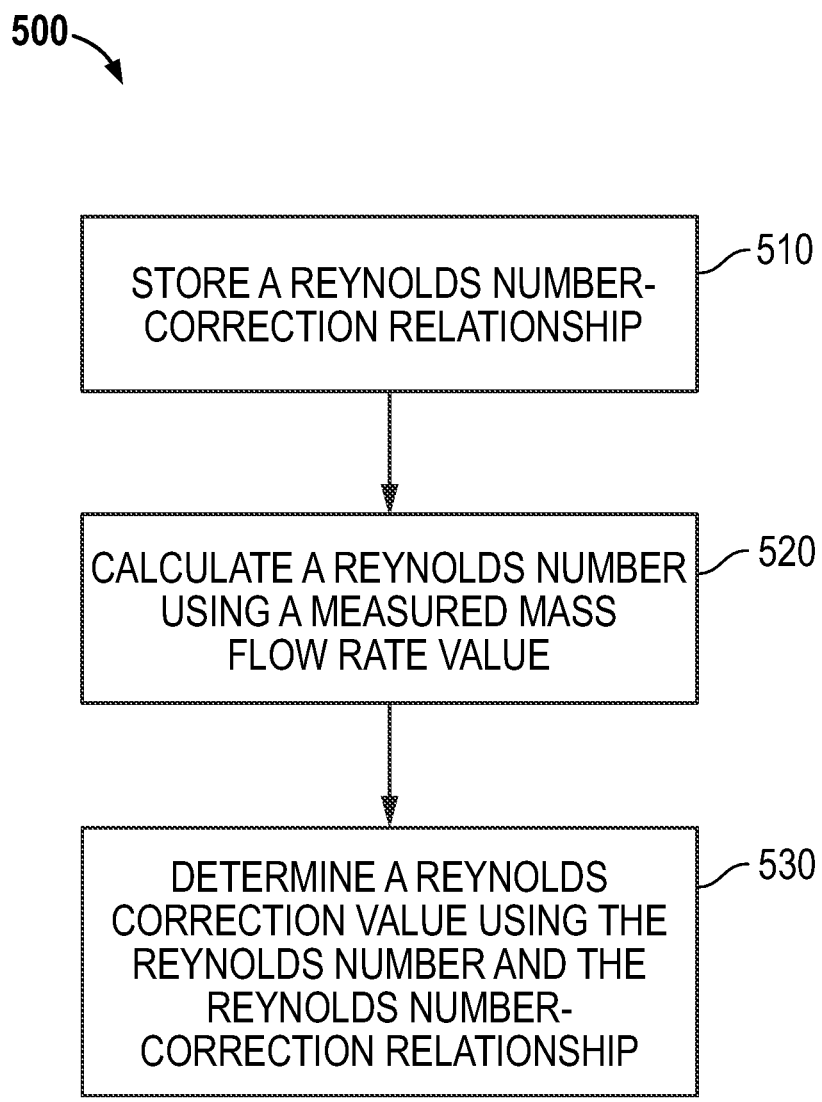
FIG. 5 shows a method 500 of using a Reynolds number to correct a mass flow rate measurement.

FIG. 5 shows a method 500 of using a Reynolds number to correct a mass flow rate measurement. As shown in FIG. 5, the method 500 stores a Reynolds number-correction relationship in step 510. The Reynolds number-correction relationship may be stored in a meter electronics, such as the meter electronics 20 described above. In step 520, the method 500 calculates a Reynolds number using a measured mass flow rate value. In particular, the method 500 calculates the Reynolds number using the viscosity value, a dimension of the conduit in the sensor assembly, and/or a measured mass flow rate value of the fluid. In step 530, the method 500 determines a Reynolds number-based correction value. More specifically, the method 500 determines the Reynolds number-based correction value using the Reynolds number and the Reynolds number-correction relationship.

The method 500 may calculate the measured mass flow rate value based on a time-delay between a left pickoff sensor signal and a right pickoff sensor signal of the sensor signals. The time-delay between the left pickoff sensor signal and the right pickoff sensor signal of the sensor signals may be calculated using zero crossing points of the left pickoff sensor signal and the right pickoff sensor signal. The method 500 may also correct a mass flow rate measurement, which may be the same as the measured mass flow rate value, as described above with reference to equations [2] and [3], although any suitable correction equations, methods or the like may be employed.

The Reynolds number may be calculated using the viscosity value, the dimensions of the conduit of the sensor assembly, and the mass flow rate value by using equation [7] described above, although any suitable equation may be employed, including those directed to other conduit geometries, such as square, oval, or the like conduits. As discussed above, the viscosity may be measured by a viscometer that is communicatively coupled with the meter electronics. Alternatively, the meter electronics may be configured to determine a density value of the fluid from the sensor signals and determine a viscosity value from the density value.

Figure 6:
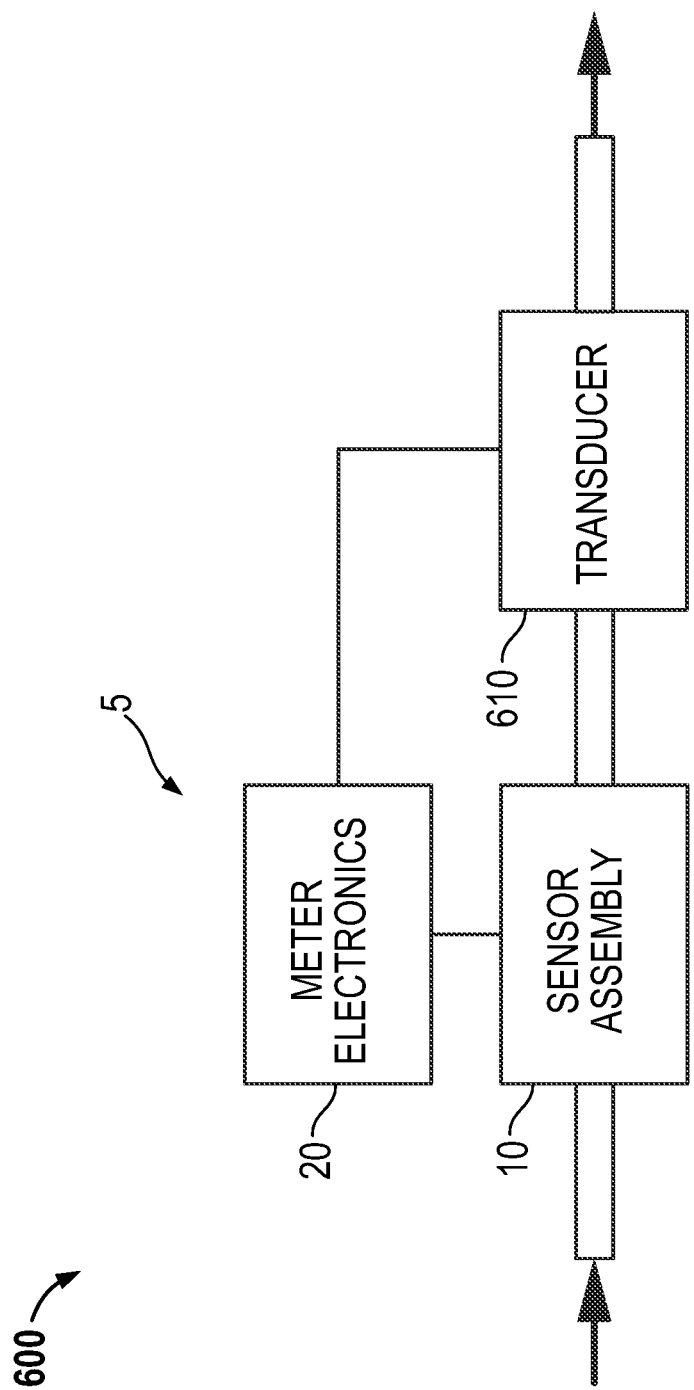
FIG. 6 shows a system 600 for using a Reynolds number to correct a mass flow rate measurement of a fluid.

FIG. 6 shows a system 600 for using a Reynolds number to correct a mass flow rate measurement of a fluid. As shown in FIG. 6, the system 600 includes the vibratory meter 5 described above, although any suitable vibratory meter may be employed. The vibratory meter 5 is shown as including the sensor assembly 10 and the meter electronics 20. The meter electronics 20 may include a processing system, such as the processing system 402 described above. The system 600 also includes a transducer 610 that is communicatively coupled with the meter electronics 20 and fluidly coupled to the sensor assembly 10. However, in alternative embodiments, the system 600 may not include the transducer 610 and may be comprised of the vibratory meter 5, where the meter electronics 20 determines the viscosity using a density value determined from the sensor signals provided by the sensor assembly 10.

As illustrated by arrows, the sensor assembly 10 receives a fluid, senses the fluid, and provides sensor signals to the meter electronics 20. The sensor assembly 10 is also configured to provide the fluid to the transducer 610. The transducer 610 is configured to receive and measure the fluid and provide viscosity related data, such as a viscosity value, to the meter electronics 20. The viscosity related data provided by the transducer 610 may have an uncertainty that is lower than an uncertainty of a viscosity value calculated from a density determined based on sensor signals provided by the sensor assembly 10. Accordingly, the meter electronics may also correct a mass flow rate measurement as described above with reference to equations [2] and [3], although any suitable correction equations, methods or the like may be employed.

The vibratory meter 5, meter electronics 20, method 500, and system 600 described above may use a Reynolds number to correct a mass flow rate measurement of a fluid. In particular, the Reynolds number may be based on a measured mass flow rate value. As explained above, the measured mass flow rate value may have less uncertainty than a density value, or the like. The Reynolds number is also calculated using a viscosity value that can be determined from a viscometer communicatively coupled to the meter electronics or from the density value determined from the sensor signals. The viscosity value determined from a viscometer may have less uncertainty than a viscosity value determined from a density value based on the sensor signals. Accordingly, should a minimal uncertainty be desired, the meter electronics may be configured to communicate with a viscometer. However, this may be prohibitively expensive for some applications. Should a more uncertain Reynolds number be acceptable, the viscosity value used to calculate the Reynolds number may be based on the density value determined from the sensor signals. In the latter configuration, the uncertainty of the Reynolds number may still be acceptably low due to the Reynolds number being determined based on a measured mass flow rate value.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other meter electronics, methods, and systems for using a Reynolds number to correct a mass flow rate measurement of a fluid and not just to the embodiments described above and shown in the accompanying figures. Accordingly, the scope of the embodiments described above should be determined from the following claims.

We claim:

1. A meter electronics (20) for using a Reynolds number to correct a mass flow rate measurement of a fluid, the meter electronics (20) comprising:
    an interface (401) configured to communicatively couple to a sensor assembly (10) containing the fluid and receive sensor signals from the sensor assembly (10); and
    a processing system (402) communicatively coupled to the interface (401), the processing system (402) being configured to:
        store a Reynolds number-correction relationship, wherein the Reynolds number-correction relationship relates Reynolds number values with Reynolds number-based correction values;
        calculate a Reynolds number of the fluid using a measured mass flow rate value of the fluid; and
        determine a Reynolds number-based correction value using the Reynolds number and the Reynolds number-correction relationship.

2. The meter electronics (20) of claim 1, wherein the processing system (402) being configured to calculate the Reynolds number correction factor using the measured mass flow rate value of the fluid comprises the processing system (402) being configured to calculate the Reynolds number using a viscosity value of the fluid and the measured mass flow rate value of the fluid.

3. The meter electronics (20) of claim 1, wherein the processing system (402) being configured to calculate the Reynolds number correction factor using the measured mass flow rate value of the fluid comprises the processing system (402) being configured to calculate the Reynolds number using a dimension of a conduit in the sensor assembly (10) and the measured mass flow rate value of the fluid.

4. The meter electronics (20) of claim 1, wherein processing system (402) being configured to calculate the Reynolds number using the measured mass flow rate value of the fluid comprises the processing system (402) being configured to use the equation:

$$Re = \frac{2\dot{m}}{\pi d \mu};$$

where:
    $\dot{m}$ is the measured mass flow rate value of the fluid;
    d is a diameter of the conduit of the sensor assembly (10); and
    $\mu$ is a viscosity of the fluid.

5. The meter electronics (20) of claim 1, wherein the interface (401) is further configured to communicatively couple with a transducer configured to measure and provide viscosity related information of the fluid and the meter electronics (20) is further configured to determine the viscosity value of the fluid based on the viscosity related information.

6. The meter electronics (20) of claim 1, wherein the processing system (402) is further configured to determine a density value of the fluid from the sensor signals and determine the viscosity value from the density value.

7. The meter electronics (20) of claim 1, wherein the Reynolds number-correction relationship comprises one of a mathematical relationship and ordered pairs that relate Reynolds number values with Reynolds number-based correction values.

8. A method of using a Reynolds number to correct a mass flow rate measurement of a fluid, the method comprising:
    receiving sensor signals with a meter electronics, wherein the sensor signals are provided by a sensor assembly containing the fluid;
    storing a Reynolds number-correction relationship in the meter electronics, wherein the Reynolds number-correction relationship relates Reynolds number values with Reynolds number-based correction values;
    calculating a Reynolds number of the fluid using a measured mass flow rate value of the fluid; and
    determining a Reynolds number-based correction value using the Reynolds number and the Reynolds number-correction relationship.

9. The method of claim 8, wherein calculating the Reynolds number of the fluid using the measured mass flow rate of the fluid comprises calculating the Reynolds number of the fluid using a viscosity value of the fluid and the measured mass flow rate value of the fluid.

10. The method of claim 8, wherein calculating the Reynolds number of the fluid using the measured mass flow rate of the fluid comprises calculating the Reynolds number of the fluid using a dimension of a conduit in the sensor assembly and the measured mass flow rate value of the fluid.

11. The method of claim 8, wherein calculating the Reynolds number using the measured mass flow rate value of the fluid comprises using the equation:

$$Re = \frac{2\dot{m}}{\pi d \mu};$$

where:
    $\dot{m}$ is the measured mass flow rate value of the fluid;
    d is a diameter of the conduit of the sensor assembly (10); and
    $\mu$ is a viscosity of the fluid.

12. The method of claim 8, further comprising:
    receiving viscosity related information from a transducer configured to measure and provide viscosity related information of the fluid; and
    determining the viscosity value of the fluid using the viscosity related information.

13. The method of claim 8, further comprising determining a density value of the fluid from the sensor signals and determining the viscosity value from the density value.

14. The method of claim 8, wherein the Reynolds number-correction relationship comprises one of a mathematical relationship and ordered pairs that relate Reynolds number values with Reynolds number-based correction values.

15. A system (600) for using a Reynolds number to correct a mass flow rate measurement of a fluid, the system (600) comprising:

a sensor assembly (10) containing the fluid and receive sensor signals from the sensor assembly (10); and a meter electronics (20) communicatively coupled to the sensor assembly (10), the meter electronics (20) being configured to:

store a Reynolds number-correction relationship, wherein the Reynolds number-correction relationship relates Reynolds number values with Reynolds number-based correction values;

calculate a Reynolds number of the fluid using a measured mass flow rate value of the fluid; and determine a Reynolds number-based correction value using the Reynolds number and the Reynolds number-correction relationship.

16. The system (600) of claim 15, wherein the system (600) further comprises:

a transducer (610) communicatively coupled to the meter electronics (20), the transducer (610) being configured to provide viscosity related information to the meter electronics (20); and wherein the meter electronics (20) is configured to calculate the viscosity value of the fluid using the viscosity related information provided by the transducer (610).

\* \* \* \* \*